Oct. 7, 1958 R. S. ZEBARTH 2,855,094
STAINLESS BELT INSPECTION TABLE
Filed March 21, 1955 3 Sheets-Sheet 1
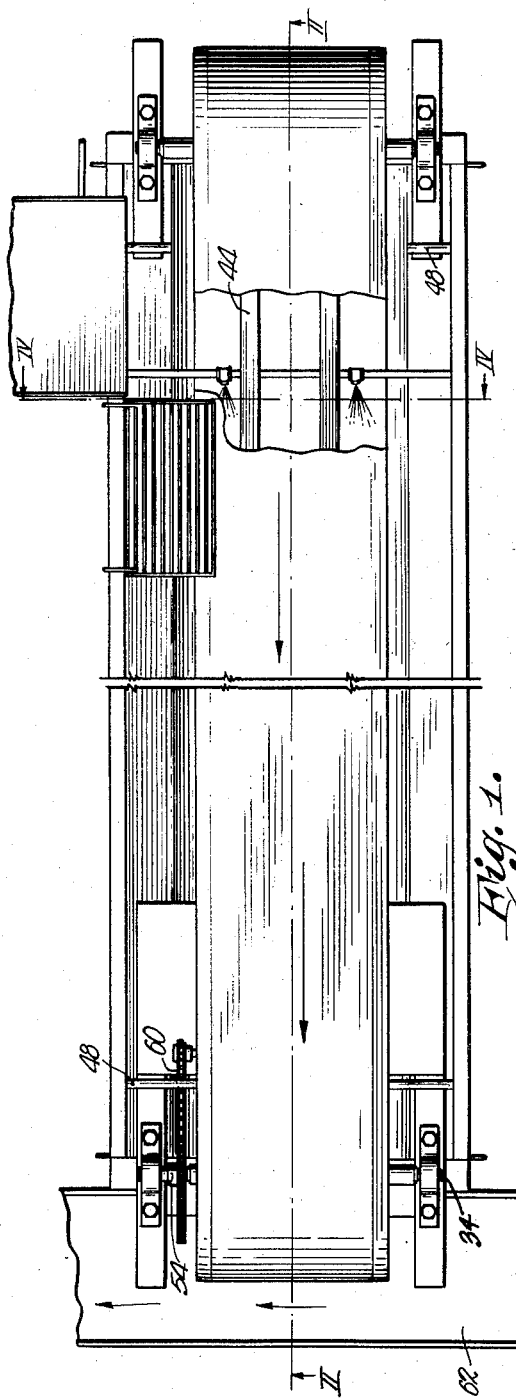
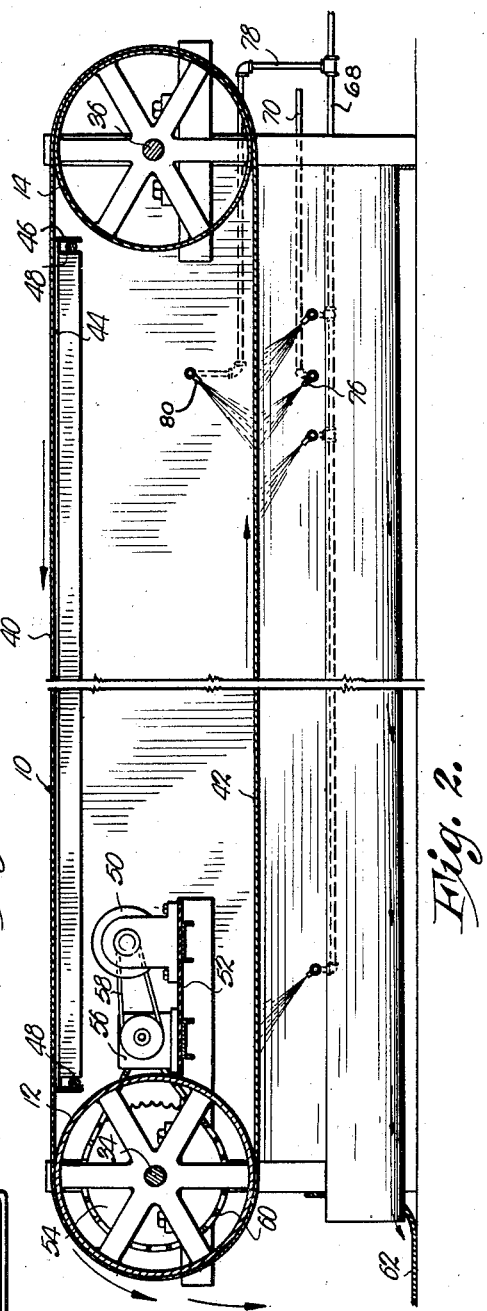
INVENTOR.
Ralph S. Zebarth
BY
ATTORNEY.

Oct. 7, 1958  R. S. ZEBARTH  2,855,094
STAINLESS BELT INSPECTION TABLE
Filed March 21, 1955  3 Sheets-Sheet 2

INVENTOR.
Ralph S. Zebarth
BY
ATTORNEY.

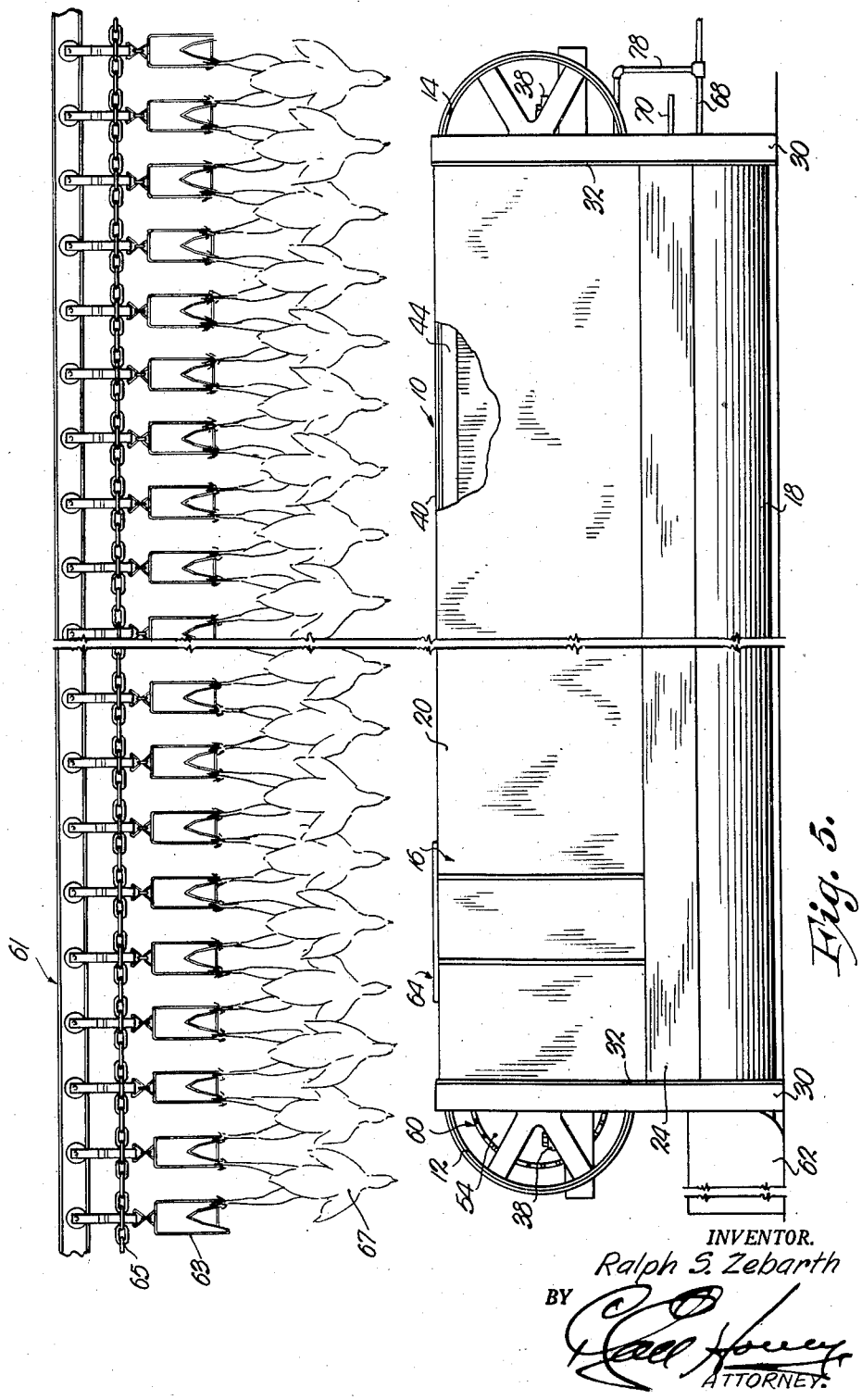

United States Patent Office 2,855,094
Patented Oct. 7, 1958

2,855,094

STAINLESS BELT INSPECTION TABLE

Ralph S. Zebarth, Hickman Hills, Mo., assignor to Gordon Johnson Equipment Company, Kansas City, Mo., a corporation of Missouri Application March 21, 1955, Serial No. 495,637

1 Claim. (Cl. 198—230)

This invention relates to improvements in equipment for use in the slaughtering and dressing of poultry and has for its primary object the provision of a structure for facilitating evisceration operations and taking the form of a worktable movable continuously in one direction and adapted to aid Government inspectors in checking the birds for wholesomeness.

It is the most important object to provide inspection equipment for use in the evisceration of poultry that includes, in addition to a continuous belt having an uppermost stretch presenting a movable worktable, a novel open-top cabinet, within which the belt is operably mounted, for receiving offal and the like from the table and having as a part thereof, a collection trough forming a bottom along which such waste material is flushed to a point of disposal.

Another very important object of this invention is to provide evisceration equipment as above set forth having, within the cabinet thereof, a spray system for flushing away from the belt and into the said trough, all waste parts of the butchered fowl such as the digestive tract, blood, lungs and other parts removed during the dressing operations whereby to maintain the uppermost stretch of the belt or the worktable clean at all times and, more particularly, to prevent collection of such refuse between the belt and the crowned drums around which the belt is trained.

Another important object of this invention is to provide equipment as above set forth constructed in a novel manner to permit the utilization of stainless steel or similar material throughout and even in the belt itself for purposes of sanitation, ease of cleaning and reduction of maintenance and replacement costs.

A further object of this invention is to provide a movable table adapted for disposition beneath a continuous conveyor along which the poultry is advanced through use of conventional shackles permitting operators, located along the sides of the cabinet, to quickly and easily butcher the birds and permit the waste matter to fall upon the belt, the latter being disposed so that the cabinets collects any of such material that may fall laterally from the belt, thereby maintaining a sanitary condition at all times and eliminating all concern on the part of the operators with respect to disposal of the offal.

Other important objects of this invention include the way in which the aforesaid spray means take the form of nozzles directed to the lowermost stretch of the belt thereabove and therebelow in a direction counter to its direction of movement so as to effectively maintain the same in a clean condition; the manner of providing a lateral drain at one end of the cabinet for receiving the waste materials from the belt as well as from the trough and for carrying away the flushing liquid; the manner of reinforcing the uppermost stretch of the belt therebeneath through utilization of a support in the nature of longitudinally extending slide bars whereby to prevent sagging of the uppermost stretch of the belt; and many more minor objects including important details of construction, all of which will be made clear or become apparent as the following specification progresses, reference being had to the accompanying drawings, wherein:

Figure 1 is a top plan view of a stainless belt inspection table made pursuant to my present invention, parts being broken away to reveal details of construction.

Fig. 2 is a substantially central, longitudinal, cross-sectional view taken on line II—II of Fig. 1.

Fig. 5 is a side elevational view of the table showing the same associated with an overhead poultry conveyor.

Figure 3:
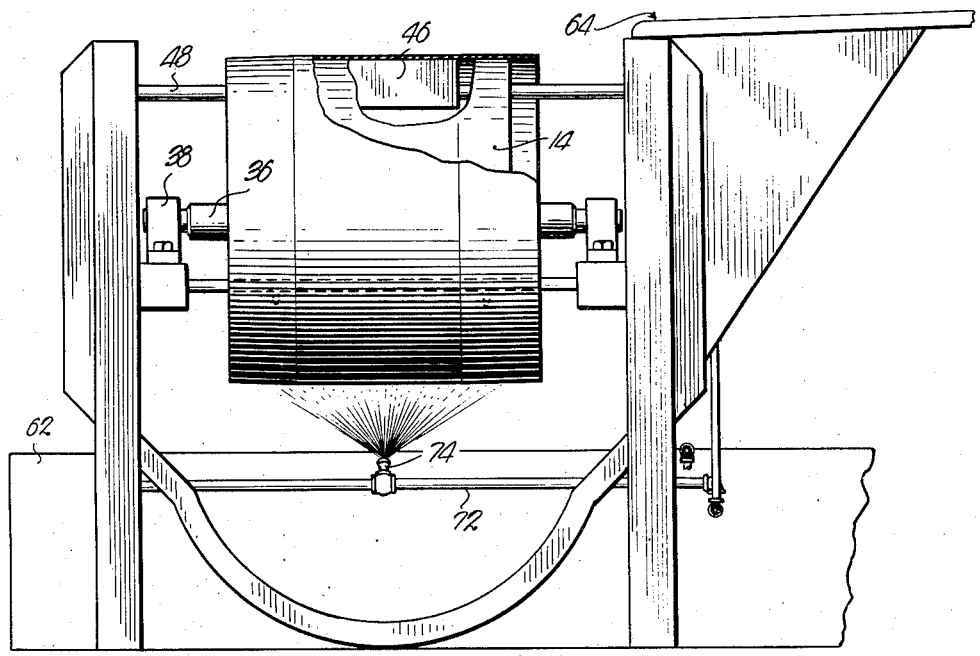
Fig. 3 is an end elevational view, parts being broken away and in section for clearness.

The primary component parts of the inspection equipment illustrated in the drawings, include a continuous belt broadly designated by the numeral 10, carried by a pair of opposed crowned drums 12 and 14 and mounted within an open top cabinet 16 having a flush trough 18 forming the bottom thereof.

In addition to the trough 18, the cabinet 16 consists of a pair of spaced, upright side walls 20 and 22 joining with the trough 18 through downwardly and inwardly inclined aprons 24 and 26 respectively. Any suitable framework may be employed for supporting and reinforcing the parts 18, 20, 22, 24 and 26 of the cabinet 16 such as longitudinal beams 28, legs 30 and exterior ribs 32, all operably interconnected in any conventional manner.

Drums 12 and 14 are provided with horizontal shafts 34 and 36 respectively, rotatably carried by bearings 38 suitably mounted in the cabinet 16.

When the continuous belt 10 is trained around the drums 12 and 14 (the latter being crowned as aforementioned to hold the belt 10 in place) there is presented an elongated, substantially horizontal, uppermost stretch 40 preferably disposed adjacent the uppermost open top of the cabinet 16 and a lowermost stretch 42 directly overlying the trough 18 of the cabinet 16. Inasmuch as the stretch 40 is used as an inspection or worktable, and since the belt 10 is made from flexible material, it is desirable to prevent sagging of the stretch 40.

Accordingly, there is provided suitable support means for the stretch 40 and which may take the form of a pair of longitudinal slide bars 44 joined by ends 46, the support being in turn hooked at the ends thereof over a pair of cross rods 48 spanning the distance between the walls 20 and 22 of the cabinet 16.

The belt 10 is driven by a prime mover 50 between the stretches 40 and 42 within the cabinet 16 and mounted on a shelf 52. Prime mover 50 is coupled with a sprocket wheel 54 on the shaft 34 through a speed reducer 56, belt 58 and chain 60.

It is now well to point out that when the equipment of the instant invention is placed in use, the poultry to be butchered is brought into close proximity to the uppermost stretch 40 of the belt 10, through use of an overhead conveyor 61 from which is suspended a plurality of spaced-apart shackles 63 through use of chains 65 or the like. The shackles in turn receive the poultry 67 and, upon actuation of the conveyor 61, the birds 67 are advanced longitudinally of the stretch 40 thereabove in the same direction of movement of stretch 40 as indicated by the arrows in Figs. 1 and 2.

Figure 4:
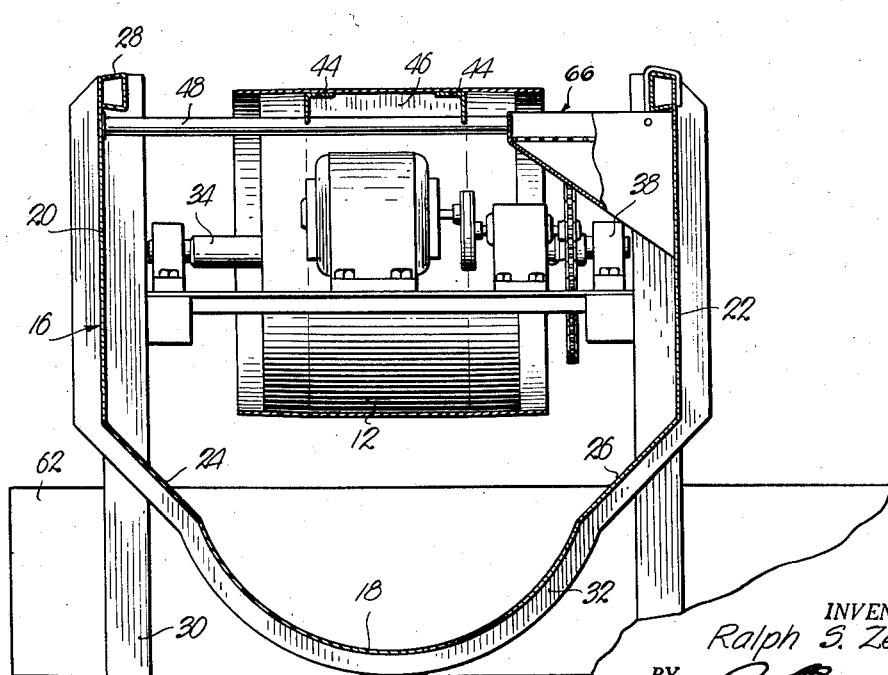
Fig. 4 is a transverse, cross-sectional view taken substantially on line IV—IV of Fig. 1.

Through use of catwalks along the sides of the cabinet 16, workmen may handle the birds 67 while in movement and all waste material cut therefrom will drop upon the upper stretch of the belt 40 and be conveyed to a point of discharge at one end thereof into a lateral drain 62. Noteworthy is the fact that the longitudinal edges of the belt 40 are spaced away from the sides 20 and 22 of the cabinet 16 and, therefore, any offal or other waste material that falls from the belt 10 before being discharged into the drain 62, will be collected by the cabinet 16 and particularly by the aprons 24 and 26 where it will fall into the trough 18. Manifestly, when the equipment is placed in use, several operating stations will be arranged along the length of the cabinet 16, as for example, a heart and liver station 64 in the nature of a laterally extending shelf, together with a gizzard station 66 as best seen in Figs. 1 and 4.

The uppermost working faces of the stretch 40 should be kept clean and the waste material should not be permitted to collect on the drums 12 and 14, particularly the latter. Accordingly, there is provided a spray system within the cabinet 16 which serves the additional purpose of flushing such material along the trough 18 and into the drain 62 with which it communicates as shown in Fig. 2.

The spray system includes cold and hot water supply pipes 68 and 70 respectively, the former having laterally extending manifolds 72 carrying nozzles 74 disposed to direct cold water, upwardly against the lowermost face of the stretch 42. The line 70 is likewise provided with a manifold having an upstanding nozzle 76. A branch 78 from the line 68 terminates in one or more nozzles 80 between the stretches 40 and 42 and disposed to direct a cold water spray upon the upper surface of the latter. It is preferable as illustrated in Fig. 2 of the drawings, that the sprays all be directed against the opposed surfaces of the stretch 42 in a direction opposite to the direction of travel of the stretch 42 to more thoroughly scrub the waste material therefrom.

It is now clear that, through the novel construction of the equipment forming the subject matter of the present invention, virtually all parts thereof may be made from a suitable material that is easily cleaned and kept in a sanitary condition, and which will have a long life.

Therefore, it is contemplated that stainless steel be used throughout, particularly in producing the flexible belt 10 and in fabricating the walls 20 and 22, as well as the aprons 24 and 26 and the flush trough 18 of the cabinet 16.

Having thus described the invention what is claimed as new and desired to be secured by Letter Patent is:

In equipment for use in the inspection of poultry parts removed during evisceration as the poultry is advanced by an overhead conveyor, a frame; a continuous, imperforate belt carried by the frame and having an uppermost, elongated, horizontal stretch adapted for disposition beneath the conveyor in parallelism therewith to receive said parts; an elongated cabinet having a pair of upright side walls embracing the belt and terminating at the uppermost edges thereof substantially within the plane of said stretch of the belt, and an elongated, longitudinally inclined trough coextensive in length with the belt and joining the side walls, said walls being spaced from the belt whereby the trough collects said parts which fall from the belt laterally thereof, said belt having a lowermost stretch above the trough; means for continuously flushing said lowermost stretch with water; and an open top receptacle disposed at one end of the belt therebeneath for receiving said parts from the latter, said receptacle communicating with the lowermost end of the trough for receiving water and poultry parts flowing therefrom.

References Cited in the file of this patent

UNITED STATES PATENTS

| | | |
|---|---|---|
| 1,235,027 | Harrison | July 31, 1917 |
| 1,316,626 | Lundell | Sept. 23, 1919 |
| 2,482,882 | Swanson | Sept. 27, 1949 |
| 2,721,594 | Warren et al. | Oct. 25, 1955 |